Aug. 24, 1954
H. M. NORMAN
2,687,455
SAFETY EDGE MECHANISM
Filed March 13, 1951
5 Sheets-Sheet 1
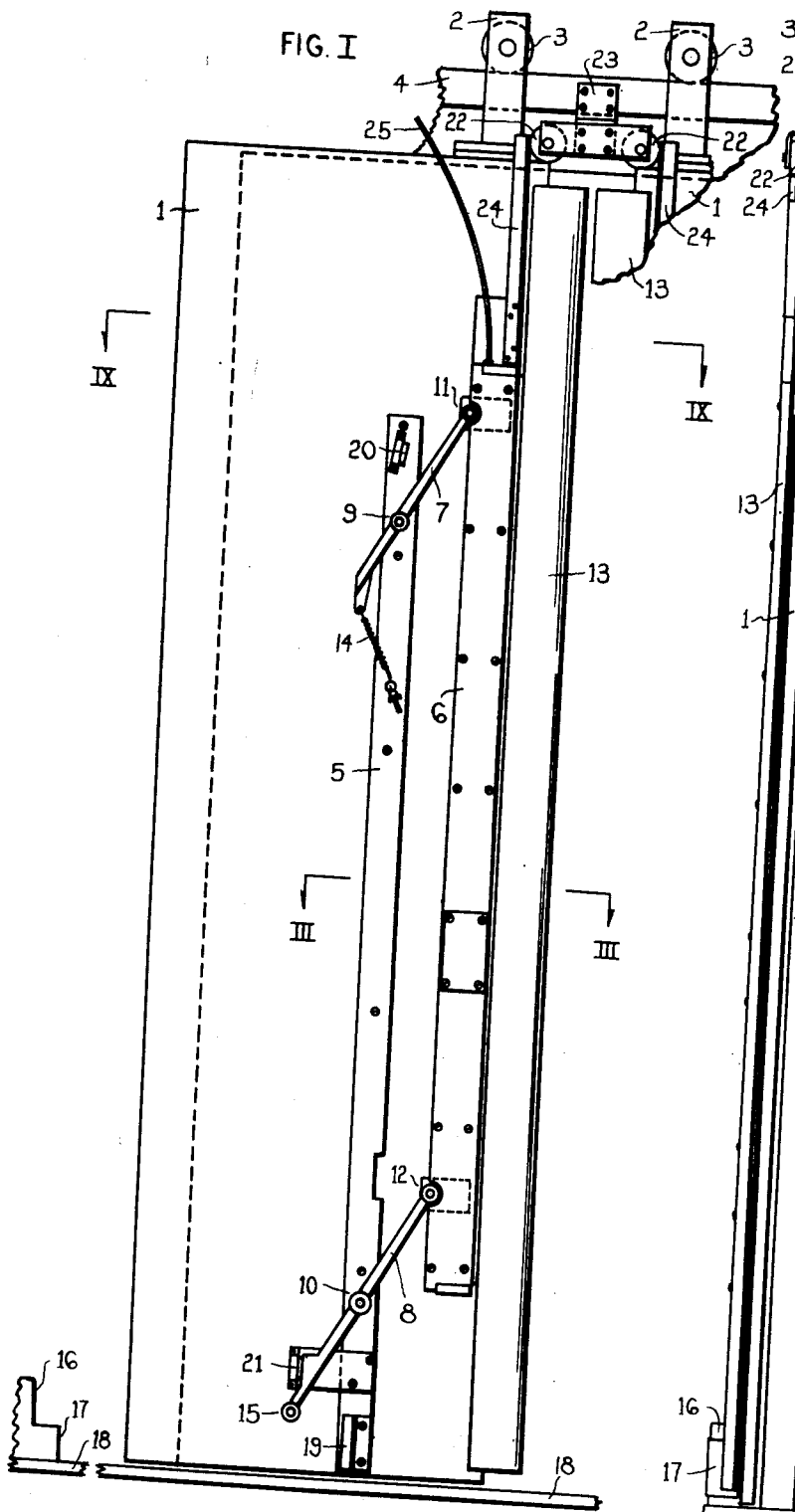
FIG. I
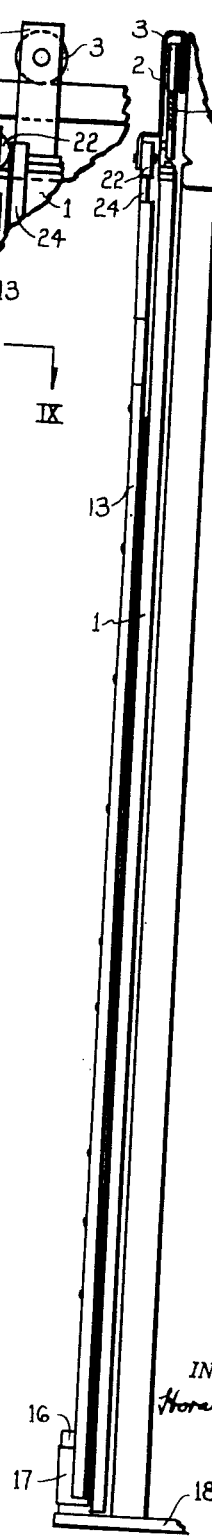
FIG. II
INVENTOR.
Horace M. Norman Aug. 24, 1954
H. M. NORMAN
2,687,455
SAFETY EDGE MECHANISM
Filed March 13, 1951
5 Sheets-Sheet 2
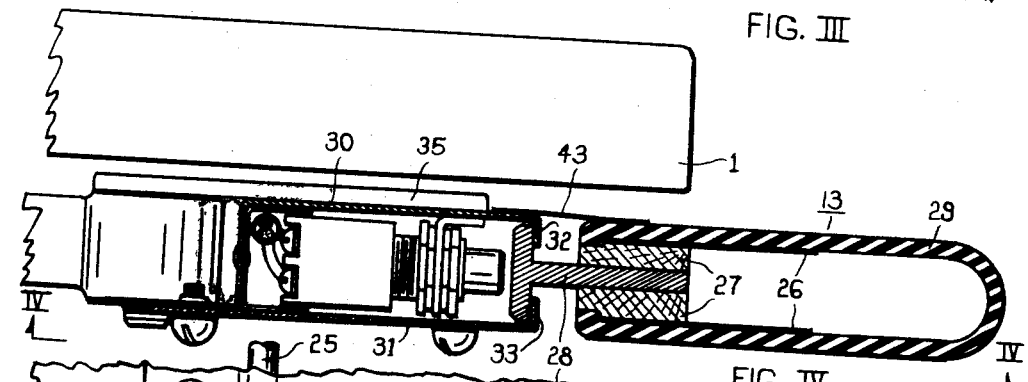
FIG. III
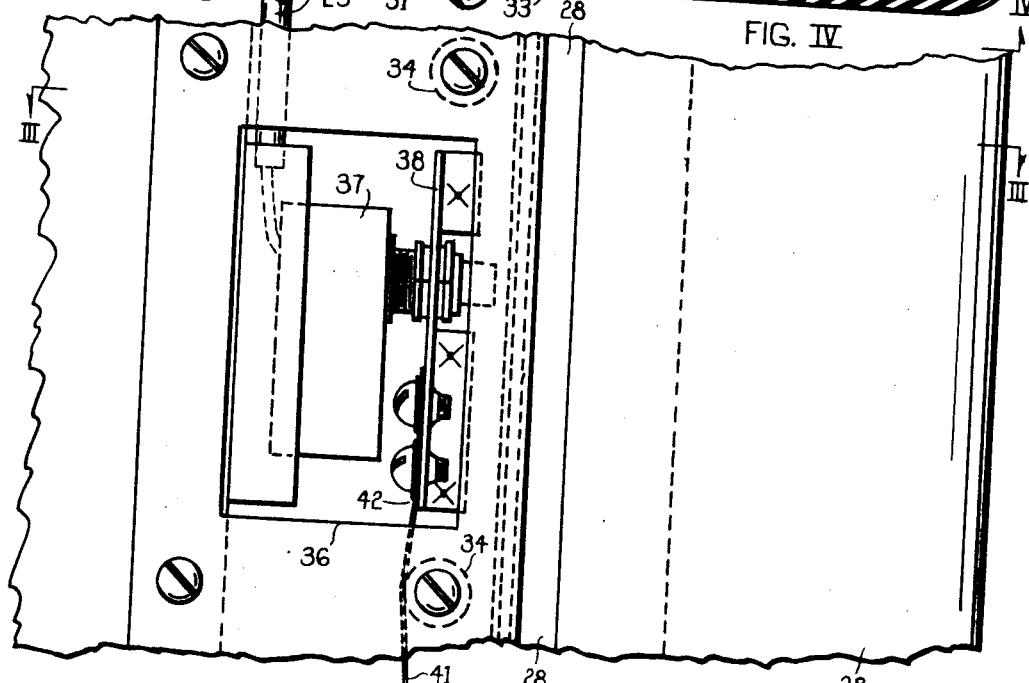
FIG. IV
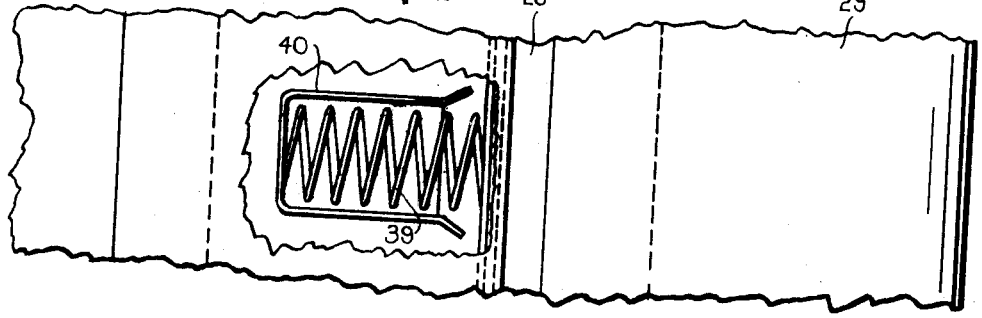
INVENTOR.
Horace M. Norman Aug. 24, 1954
H. M. NORMAN
2,687,455
SAFETY EDGE MECHANISM
Filed March 13, 1951
5 Sheets-Sheet 3
FIG. V
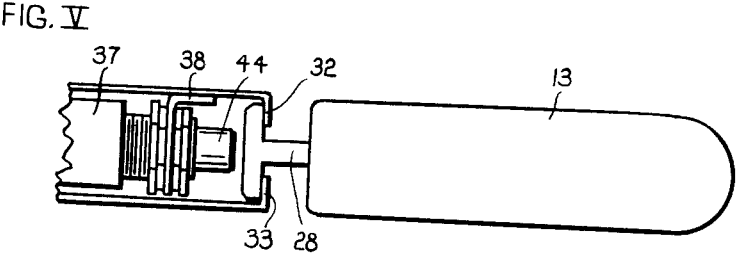
FIG. VI
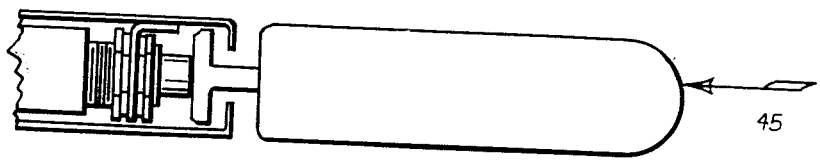
FIG. VII
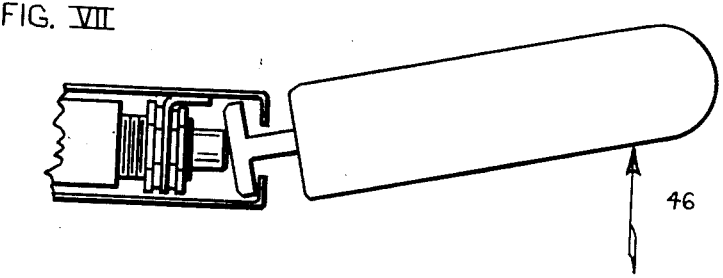
FIG. VIII
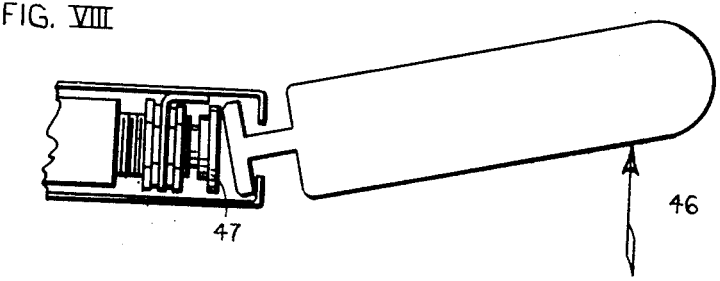
INVENTOR.
Horace M. Norman Aug. 24, 1954
H. M. NORMAN
2,687,455
SAFETY EDGE MECHANISM
Filed March 13, 1951
5 Sheets-Sheet 4
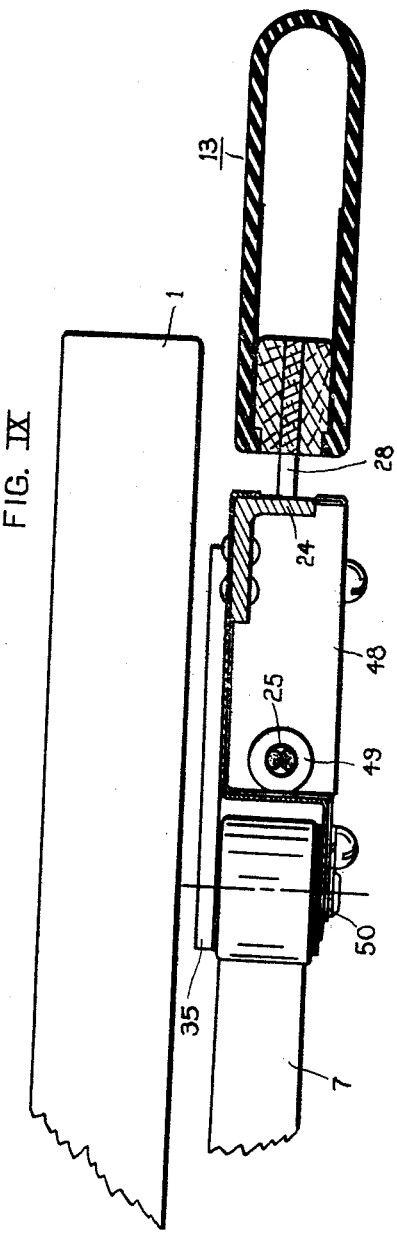
FIG. IX
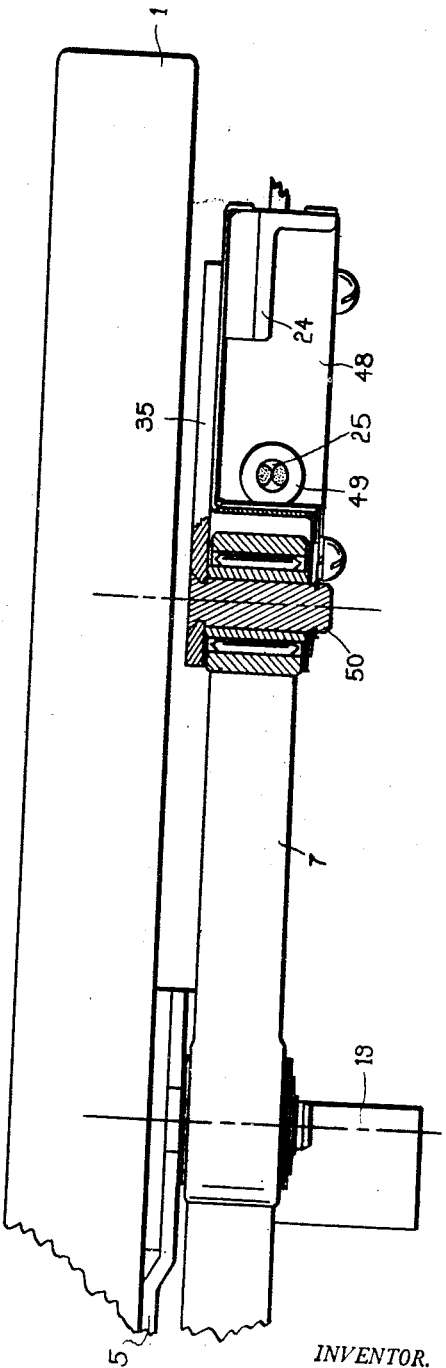
FIG. X
INVENTOR.
Horace M. Norman Aug. 24, 1954
H. M. NORMAN
SAFETY EDGE MECHANISM
2,687,455
Filed March 13, 1951
5 Sheets-Sheet 5
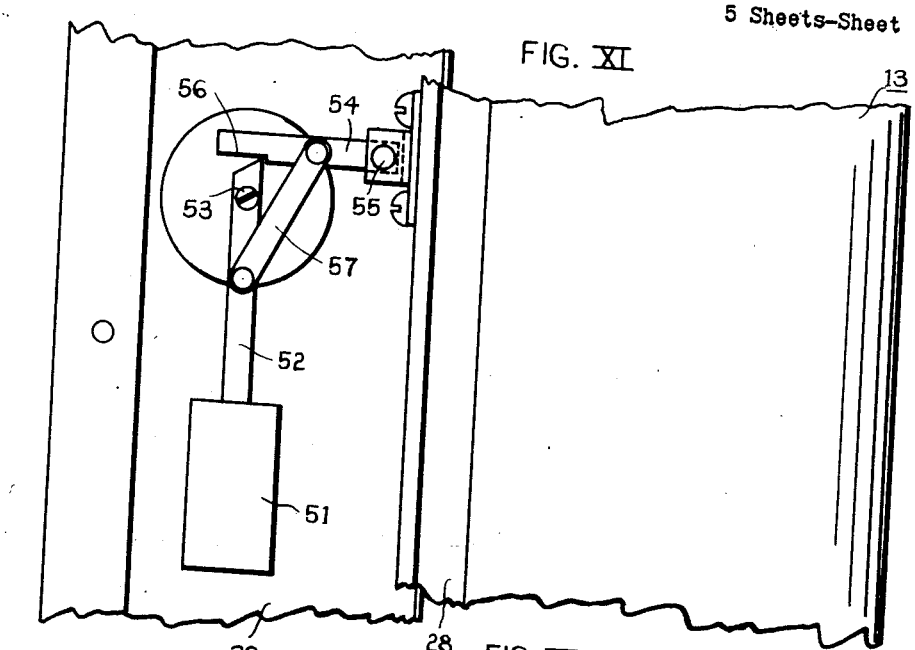
FIG. XI
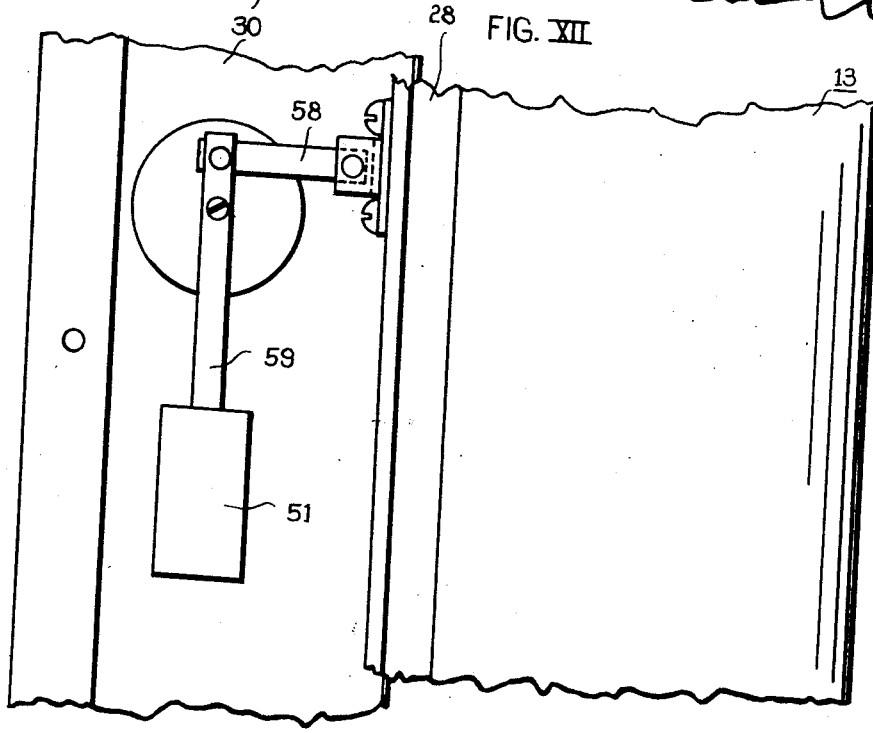
FIG. XII
INVENTOR.
Horace M Norman Patented Aug. 24, 1954

2,687,455

UNITED STATES PATENT OFFICE 2,687,455

SAFETY EDGE MECHANISM

Horace M. Norman, Skokie, Ill.

Application March 13, 1951, Serial No. 215,305

10 Claims. (Cl. 200—61.43)

This invention relates to a safety edge mechanism for use with power operated doors and particularly to safety edge mechanism for use with power operated elevator doors.

It is convenient and facilitates rapid operation to make doors power operated. In order that persons do not become injured by a power operated door and to prevent damage to objects which may become lodged in a doorway, certain protective devices have been developed prior to my invention to arrest the closure of the door. Among these are a mounted rubber safety edge member which is linked to the door so as to have a substantially horizontal movement in the line of motion of the door. When the rubber safety edge member is moved back about ½" relative to the door, the electric operating switch is actuated which in turn causes the doors to open.

In some designs the safety edge member does not extend far enough in advance of the doors to accomplish its purpose. This no doubt is to try to minimize the effect of reducing the size of the apparent door opening for the passage of persons and materials. In some cases the safety edge member is retracted when the doors are fully opened so as to avoid this disadvantage; and the safety edge mechanism is rendered inactive to operation (by means of an auxiliary electric switch) for the last few inches of travel as the doors near their fully opened position. When this is done there is a disadvantage from the point of view of operation. Suppose that the car is operatorless and the doors close automatically after a predetermined time. If it is desired to hold the doors open by pushing the safety edge back then the awkward effect will be experienced of the doors starting to close, then reversing and opening. This cycle keeps repeating until the safety edge is released. For center opening doors in some installations the safety edges are in line and when the doors close the edges butt up against each other. In order that the doors do not open, due to the safety edges bumping themselves, the safety edges are rendered inactive to operation (by means of an auxiliary electric switch) for the last few inches of travel as the doors near their fully closed position. Rendering the edges inactive, as just described, introduces the great disadvantage of not giving the proper protection should a person's hand or foot get caught between the doors as they are about to close. There is also the disadvantage of the safety edges bumping each other and eventually distorting the shape of the rubber edges as so frequently happens on existing installations of this type.

In another type of safety edge mechanism which was developed prior to my invention, a perforated rubber plate is fastened so as to overlap the leading edge of a door. The rubber plate contains a small tightly drawn cable imbedded in its leading edge which, if displaced by bumping, actuates the electric operating switch and causes the door to open. This type has a disadvantage in that external forces (as caused by a person) which are substantially in the direction of motion of the door tend to compress the rubber plate rather than bend its leading edge over in order to displace the imbedded cable. A larger than comfortable force is thus required to operate this type of safety edge mechanism when displaced in the direction of motion of the door.

With the foregoing considerations in mind the safety edge mechanism presented in the included drawings was conceived.

The primary object of my invention is to provide a new and novel safety edge mechanism for use with power operated doors, particularly elevator doors, in which a safety edge is adapted to be retracted (relative to the door upon which it is mounted) yet not be rendered inactive to safety operation at any time.

A further object of my invention is to provide a safety edge mechanism for use on a door in which the safety edge is easily responsive to external forces which are parallel to, perpendicular to, or oblique to the direction of travel of the door.

A still further object of my invention is to provide an effective and simpler method of retracting the safety edge as the door upon which it is mounted nears its fully opened position.

Another object of my invention is to provide retracting mechanism for use with center opening doors so as to retract the safety edge members as the doors upon which they are mounted near their fully closed position, and thereby prevent bumping of the safety edge members against each other.

Another object of my invention is to eliminate the need for auxiliary switches used to render the safety edge inactive while at the retracted position.

Another object of my invention is to provide a safety edge mechanism for use with elevator doors in which a safety edge is mounted on a car door so as to provide protection to passengers against being bumped by either the hall door or the car door.

Other objects and advantages will become apparent from the following description and the accompanying drawings.

In the drawings, wherein like numerals are employed to designate like parts throughout the views—

Fig. I is a general assembly side view illustrating the manner in which the safety edge mechanism is mounted for operation on an elevator car door.

Fig. II is a sectional end view of the assembly illustrated in Fig. I. The section is taken transversely through the center of the door opening.

Fig. III is a sectional detail view of the safety edge member and the safety edge holder. The section is taken along the line III—III in Fig. I and along the line III—III in Fig. IV.

Fig. IV is a detailed side view of the safety edge member and safety edge holder showing the mounting of the switch and the mounting of the compression springs.

Figs. V, VI, and VII are diagrams illustrating the relative positions of the safety edge member, safety edge holder, and switch plunger when various conditions of external force are applied to the safety edge member.

Fig. VIII is a diagram illustrating a method of increasing the sensitivity of the electric operating switch plunger to lateral deflection of the safety edge member.

Fig. IX represents a plan, partially in section taken on the line IX—IX in Fig. I, which illustrates in detail the safety edge member, the top of the safety edge holder, and part of the top link arm.

Fig. X represents a plan partially in section, which illustrates in detail the bearing arrangement used in articulatively mounting the safety edge holder to the link arm. A partial section is taken through the center of the bearing.

Fig. XI illustrates one type of inertia compensating device for use on doors which open and close at extremely high speeds.

Fig. XII illustrates another type of inertia compensating device.

Refer to Figs. I and II which illustrate a manner of mounting the safety edge mechanism upon an elevator car door. The doors 1 illustrated are of the center opening type in which the two car doors are adapted to open one to each side of the center of the car opening. The doors are carried by means of hangers 2 and rollers 3 upon the rail 4. The rail 4 is fastened rigidly to the car. In Fig. I, only a portion of the right hand door and its associated safety edge mechanism is illustrated and described as the parts may be symmetrical about the center of the car opening. A mounting plate 5 is rigidly fastened to the car door 1. The safety edge holder 6 is linked to the mounting plate 5 by means of the link arms 7 and 8. The link arms 7 and 8 are articulatively fastened to the mounting plate 5 by means of needle bearings at positions 9 and 10. The link arms 7 and 8 are also articulatively fastened to the safety edge holder 6 by means of needle bearings at positions 11 and 12. The distance between the bearings at 9 and 11 is made equal to the distance between the bearings at 10 and 12 and the distance between the bearings at 9 and 10 is made equal to the distance between the bearings at 11 and 12 so that the safety edge holder 6 and the safety edge member 13 may move relative to the car door yet always remain parallel to the edge of the car door. The manner in which the safety edge member 13 is held by the safety edge holder will be explained in the description of Figs. III and IV. A tension spring 14 is fastened to the extended portion of the link arm 7. The tension spring 14 is also fastened to the mounting plate 5 by means of a screw and nut which may be adjusted for proper spring tension. A roller 15 is mounted on the extended portion of the link arm 8. Two stops 16 and 17 are rigidly mounted on the door sill 18. The stop 16 engages the roller 15 as the car door 1 nears its fully opened position. Further movement of the car door toward its fully opened position causes the link arm 8 to rotate about its bearing at 10 thus retracting the safety edge holder and safety edge member away from the door opening. A rubber bumper 19 (fastened to the mounting plate 5) is adapted to hit against the door stop 17 and limit the amount of travel of the door in the open direction. This insures against possible damage to the safety edge retracting mechanism. The rubber bumper 19 also limits the amount of rotation of the arm 8. Rubber bumpers 20 and 21 also limit the amount of rotation of the link arms 7 and 8 respectively. A rubber roller 22 is mounted on a bracket 23 which is fastened to the rail 4. An aluminum angle piece 24, which is rigidly fastened to the safety edge holder 6 is adapted to hit against the rubber roller 22 and thus retract the safety edge member when the door nears its closed position. The safety edge member is thus retracted relative to the door when the door is at its open position and when the door is at its closed position. Retracting the safety edge member when the door is at its open position has the advantage of presenting a larger effective door opening for the movement of passengers and materials. Retracting the safety edge members when the doors are nearing their fully closed position prevents the safety edge members from butting up against each other and ultimately distorting the normal or free shape of the rubber edges, and does not require the safety edge to be rendered inactive to operation. Rubber covered flexible lead wires 25 extend from terminals on the car to an electric operating switch which is located within the safety edge holder.

Refer to Figs. III and IV. A stiff vertical back portion for the safety edge member consists of thin spring steel sheets 26 and wooden spacer strips 27 which are bonded with cement and riveted to each side of a light alloy T section 28. A leading resilient edge for the safety edge member consists of the rubber sheet 29 (about ⅛ inch thick) which is extruded in a U-shape and cemented to the thin spring steel sheet 26. The stiff vertical back position of the safety edge member is displaced relative to the safety edge holder when the safety edge member is contacted by an obstruction; also the leading resilient edge of the safety edge member is displaced (relative to the safety edge holder) all along its length when contacted by an obstruction. Thus this type of safety edge member is displaced in its entirety as distinguished from the perforated rubber plate type (having an imbedded cable) which is displaced only locally at the place of contact when contacted by an obstruction. The body of the safety edge holder consists of two long vertical steel sheets 30 and 31 bent in the form shown and fastened together with screws. The steel sheets 30 and 31 are formed with inwardly bent flanges 32 and 33 which hold the light alloy T section. Cylindrical spacers 34 are provided which are located near the flanges 32 and 33 so as to assure proper and rigid spacing of the steel sheets 30 and 31. Steel plates 35 are spot welded to the back of steel sheet 30 so as to form a connection for the link arms. An opening 36 is provided in the side of the safety edge holder to permit access to the electric operating switch 37. The electric operating switch 37 is adjustably mounted on the spot welded clip 38 by means of its threaded shank. The steel sheet 31 is shown broken away to reveal a compression spring 39 which is mounted in a trough 40 between the steel sheets 30 and 31. The trough 40 is spot welded to the steel sheet 30. A similar compression spring is similarly mounted near the top of the safety edge member and the function of the compression springs is to bear against the light alloy T section 28 thus resiliently urging the safety edge member to its nonoperating or normal position. A thin flat spring steel strip 41 has one end fastened to a position 42 on the safety edge holder. The other end of spring 41 is fastened to a position (not shown) on the T section 28. This thin flat spring steel strip 41 thus supports the weight of the safety edge member yet does not restrict the proper movement of the safety edge member relative to the safety edge holder. An alternate method of supporting the safety edge member in its holder is to have the flat spring steel strip looped over one of the spacers 34 and have both ends of the steel strip screwed or riveted to the light alloy T section. The car door 1 is shown in its relative position when the safety edge member is in its nonretracted position. The safety edge member is shown to precede the car door far enough to provide protection to passengers against being bumped by either the hall door or the car door. Very thin rubber strips 43 are bonded lengthwise along each side of the safety edge holder and the safety edge member so as to span the grooves between the safety edge holder and the safety edge member; this rubber covering is also to be provided on the top and bottom; all this being for the purpose of keeping out dirt yet not restricting the movement of the safety edge member relative to the safety edge holder. Only the strip on the back side is shown, the others being omitted so as to reveal clearly the parts that these rubber strips cover.

Refer to Figs. V, VI and VII which are diagrams. The safety edge member 13 is adapted to precede the edge of the door 1 and contact an obstruction as the door moves toward its closed position. Fig. V illustrates the relative position of the parts when no external force is applied to the safety edge member. The light alloy T section 28 is shown pressed to its normal position against the inwardly bent flanges 32 and 33 by the compression springs 39. In this position the light alloy T section does not bear on the switch plunger 44.

Fig. VI illustrates the relative position of the parts when an external force such as 45 is applied to the safety edge member. The light alloy T section is shown forced away from the flanges and is shown bearing against the switch plunger and operating the electric switch. Operation of the electric switch causes the electric motor which power operates the door to be reversed and hence cause the door to reverse its motion and return to its open position. The external force 45 is parallel to the direction of travel of the door and could be caused by a person or other obstruction in the doorway.

Fig. VII illustrates the relative positions of the parts when an external force such as 46 is applied to the safety edge member. The force 46 is perpendicular to the direction of travel of the door. The T section is shown to pivot against one of the flanges and to bear against the switch plunger thus operating the electric switch. It is thus seen that the safety edge member is easily responsive to external forces which may be parallel to and perpendicular to the direction of travel of the door and therefore is also responsive to external forces which are oblique to the direction of travel of the door.

Refer to Fig. VIII which illustrates a method of increasing the sensitivity of the switch plunger 44 to lateral deflection of the safety edge member as caused by an external lateral force such as 46. The switch plunger 44 is provided with a cap 47 having a wide flat end surface perpendicular to the direction of travel of the switch plunger. The switch plunger receives a greater amount of travel for a given amount of lateral deflection of the safety edge member due to the fact that the cap 47 contacts the T section of the outer edge of the T section instead of near the center.

Refer to Fig. IX which illustrates additional design features of the safety edge mechanism. An end cover 48 is spot welded to the steel sheet so as to exclude the dirt from the inside of the safety edge holder. A rubber grommet 49 is provided in the top cover 48 for passage of the flexible lead wires 25.

Refer to Fig. X which illustrates a typical bearing arrangement. The pin 50 is connected to the steel plate 35. A needle bearing is fitted on the pin 50 and held in place with a snap ring.

Refer to Fig. XI. For doors which open and close at extremely high speeds, an inertia compensating device may be necessary to prevent the safety edge member from being displaced (relative to the safety edge holder) due to its own inertia. In this Fig. XI the steel sheet 31 is shown removed to reveal the inertia compensating device. The weight 51 is fastened to the lever 52 which is pivotally mounted on a pin 53 on the steel sheet 30. The arm 54 is articulatively fastened at 55 to the light alloy T section on the safety edge member. The arm 54 is provided with an indented step 56. The top end of the lever 52 is latched to the arm 54 as it bears against the indented step 56. Assume the door during its closing operation to be accelerated so as to tend to urge the safety edge member (due to its own inertia) away from its normal position. The weight 51 will simultaneously be urged in the same direction (due to its own inertia) and will cause the lever 52 to pivot about its fulcrum at 53 and bear against the indented step 56 thus supplying a counteractive force to prevent displacement of the safety edge member. It is desirable to make the safety edge member as light as practicable in order that a person who is in its path will be hit by a small force. For this reason, the arm 54 is latched to the lever 52. When the safety edge member hits a person the safety edge member will be displaced from its normal position but the weight 51 will have a very small movement because the link 57 will lift the arm 54 over its indented step 56 and release the lever 52. Thus a person hit by the safety edge member would not receive the additional shock force supplied by the weight 51. Means for lightening the mechanism as a whole is the selection of as high a leverage ratio as is practicable for the lever 52. This results in the necessary weight of 51 to perform its function being lessened.

The inertia compensating device illustrated in

Fig. XII is the same as that illustrated in Fig. XI except that the arm 58 is pivotally connected to the lever 59 by means of pin instead of being latched to the lever. Thus this type enjoys a much simpler construction but has the disadvantage of subjecting a person to a larger shock force when hit by the safety edge member.

All figures are substantially to full size scale except Fig. I and Fig. II which are approximately one eighth size.

Although I have illustrated and described certain specific embodiments of my invention, it will be apparent that numerous modifications might be made without departing from the scope of the invention. For instance the safety edge mechanism may be used with power operated doors other than elevator doors. It is therefore my intention that such scope be limited only by the terms of the appended claims.

I claim:

1. In a safety edge mechanism for use with a power operated elevator door of the type which moves rectilinearly to open and closed positions, a safety edge holder mounted on the door in a manner so as to be movable as a unit relative to and in the same direction as the door, a safety edge member held by said safety edge holder in a manner so as to be movable as a unit relative to said safety edge holder and in the same direction as the door; an electric switch mounted in a manner such that movement of the safety edge member relative to the safety edge holder causes the electric switch to be operated, said safety edge member adapted to precede the edge of the door and contact an obstruction as the door moves toward its closed position, and means for retracting the safety edge holder and safety edge member as the door nears its closed position.

2. In a safety edge mechanism for use with a power operated door of the type which moves rectilinearly to open and closed positions in a doorway; a safety edge holder fastened to the door; a safety edge member held by said safety edge holder; said safety edge member having a stiff vertical back portion to which is fastened a leading edge of resilient material such as rubber; said leading edge of resilient material adapted to precede the edge of the door and contact an obstruction as the door moves toward its closed position; said safety edge member adapted to be displaced relative to said safety edge holder when contacted by an obstruction, said displacement being all along the length of the safety edge holder, said safety edge member adapted to be displaced relative to said safety edge holder when subjected to an external force which may be parallel to, perpendicular to, or oblique to the direction of travel of the door; and an electric switch mounted in a manner such that displacement of said safety edge member relative to said safety edge holder causes the electric switch to be operated.

3. A safety edge mechanism for use with a power operated door of the type which moves rectilinearly to open and closed positions in a doorway comprising a safety edge holder fastened to the door, a safety edge member held by said safety edge holder, said safety edge member having a stiff vertical back portion to which is fastened a leading edge of resilient material, said leading edge of resilient material adapted to precede the edge of the door and contact an obstruction as the door moves toward its closed position, a T section fastened to said stiff vertical back portion, said safety edge holder having a longitudinal vertically directed sheet on each of two sides, said sheets having inwardly projecting flanges, said T section being resiliently held against said inwardly projecting flanges, an electric switch mounted in said safety edge holder, said electric switch having a movable operating member, said T section to receive movement relative to said safety edge holder when the safety edge member is contacted and displaced by an obstruction, and said movement of said T section being transmitted to said movable operating member so as to operate the movable operating member.

4. A safety edge mechanism for use with a power operated elevator door of the type which moves on a guide rail to open and closed positions comprising a safety edge member, two arms each articulatively fastened to the door, each arm also being articulatively fastened to the safety edge member, said safety edge member adapted to be retracted on the arms from the leading edge of the door, a stop fixed relative to said guide rail, at least one of said arms being extended, and the extended portion of the arm adapted to engage said stop and retract the safety edge member as the door nears its fully open position.

5. A safety edge mechanism for use with a power operated elevator door of the type which moves on a rail to open and closed positions comprising a safety edge member, said safety edge member being movably mounted on the door, said safety edge member being movable relative to the door in the direction of travel of the door, said safety edge member adapted to be retracted from the leading edge of the door, said safety edge member having a stiff vertical back portion to which is fastened an edge of resilent material such as rubber, said edge of resilient material adapted to precede the edge of the door and contact an obstruction as the door moves toward its closed position, a stop fixed relative to said rail, and means carried by said safety-edge member adapted to engage said stop and retract the safety edge member as the door nears its fully closed position.

6. A safety edge mechanism for use with a pair of power operated center opening elevator doors of the type which move on a rail to open and closed positions comprising two safety edge members each carried by a safety edge holder, each said safety edge holder being movably mounted on its respective door, each safety edge holder being movable relative to its respective door in the direction of travel of its respective door, each safety edge holder with its respective safety edge member adapted to be retracted from the leading edge of its respective door, each safety edge member adapted to precede the edge of its respective door and contact an obstruction as the doors move toward their closed position, two stops fixed relative to the rail, and means on said safety edge holders engageable with said stops to retract said holders together with their respective safety edge members as the doors near their fully closed position.

7. The combination recited in claim 1; wherein the safety edge member is resiliently urged to its normal position relative to the safety edge holder by means of a spring; an inertia compensating device adapted to prevent the safety edge member from being displaced from said normal position due to inertia forces resulting from high speed operation of the door; said inertia compensating device including a weight fastened to a lever, said lever being pivotally mounted on said safety edge holder, and said lever being connected to said safety edge member.

8. The combination recited in claim 1, wherein the safety edge member is provided with a stiff vertical portion to which is fastened a leading edge of resilient material, and a T section is fastened to the stiff back portion wherein the safety edge holder has a longitudinal vertically directed sheet on each of two sides, said sheets having inwardly projecting flanges, and said T section being resiliently held against said inwardly projecting flanges; and wherein the electric switch has a movable operating member, and movement of the T section relative to the safety edge holder is transmitted to the movable operating member of the electric switch so as to operate the electric switch.

9. In a safety-edge mechanism for use with a power-actuated elevator door of the type which moves rectilinearly to open and closed positions, a safety-edge holder mounted on the door in a manner so as to be movable as a unit relative to and in the same direction as the door, a safety-edge member held by said safety-edge holder in a manner so as to be movable as a unit relative to said safety-edge holder and in the same direction as the door, control means having a normal state and an actuated state, said control means being mounted in a manner such that movement of the safety-edge member relative to the safety-edge holder causes said control means to be shifted from its normal state to its actuated state, said safety-edge member being adapted to precede the edge of the door and contact an obstruction as the door moves toward its closed position, and means for retracting the safety-edge holder and safety-edge member as the door nears its closed position.

10. In a safety-edge mechanism for use with a power-actuated elevator door of the type which moves rectilinearly to open and closed positions, a safety-edge holder mounted on the door in a manner so as to be movable as a unit relative to the door and in the same direction as the door, a safety-edge member carried by said safety-edge holder in a manner so as to be movable as a unit relative to said safety-edge holder in the same direction as the door and also at an angle thereto in a horizontal plane, control means having a normal state and an actuated state, said control means being mounted in a manner such that movement of the safety-edge member relative to said safety-edge holder causes said control means to be shifted from its normal state to its actuated state, said safety-edge member being adapted to precede the edge of the door and contact an obstruction as the door moves toward its closed position.

References Cited in the file of this patent

UNITED STATES PATENTS

| Number | Name | Date |
|---|---|---|
| 1,890,809 | Forman | Dec. 13, 1932 |
| 2,019,456 | Liebenberg | Oct. 29, 1935 |
| 2,523,645 | Bruestle | Sept. 26, 1950 |
| 2,610,268 | Hamilton | Sept. 9, 1952 |

FOREIGN PATENTS

| Number | Country | Date |
|---|---|---|
| 384,551 | Great Britain | Dec. 8, 1932 |